United States Patent
Le Chevalier et al.

(10) Patent No.: US 9,569,410 B2
(45) Date of Patent: Feb. 14, 2017

(54) MULTILAYERED DOCUMENT DISTRIBUTION IN MULTISCREEN SYSTEMS

(75) Inventors: Vincent Le Chevalier, San Jose, CA (US); Charles F. Geiger, San Jose, CA (US)

(73) Assignee: Chegg, Inc., Santa Clara, CA (US)

( * ) Notice: Subject to any disclaimer, the term of this patent is extended or adjusted under 35 U.S.C. 154(b) by 393 days.

(21) Appl. No.: 13/584,715

(22) Filed: Aug. 13, 2012

(65) Prior Publication Data

US 2014/0047320 A1    Feb. 13, 2014

(51) Int. Cl.
G06F 17/00   (2006.01)
G06F 17/22   (2006.01)
G06F 17/30   (2006.01)
G06F 17/24   (2006.01)
G06F 21/00   (2013.01)

(52) U.S. Cl.
CPC ......... *G06F 17/2229* (2013.01); *G06F 17/241* (2013.01); *G06F 17/30* (2013.01); *G06F 17/30011* (2013.01); *G06F 21/00* (2013.01)

(58) Field of Classification Search
CPC . G06F 17/30873; G06F 17/24; G06F 17/2288
See application file for complete search history.

(56) References Cited

U.S. PATENT DOCUMENTS

| | | | |
|---|---|---|---|
| 6,618,751 B1 | 9/2003 | Challenger et al. | |
| 7,801,956 B1 | 9/2010 | Cumberbatch et al. | |
| 8,478,662 B1 | 7/2013 | Snodgrass et al. | |
| 8,522,130 B1 | 8/2013 | Gilead et al. | |
| 2002/0062384 A1 | 5/2002 | Tso | |
| 2002/0120757 A1 | 8/2002 | Sutherland et al. | |
| 2003/0074559 A1* | 4/2003 | Riggs | 713/168 |

(Continued)

FOREIGN PATENT DOCUMENTS

KR   10-2011-0046822 A   5/2011
KR   10-2011-0047775 A   5/2011

(Continued)

OTHER PUBLICATIONS

PCT International Search Report and Written Opinion for PCT/US2013/058074, Sep. 4, 2013, 8 Pages.

(Continued)

*Primary Examiner* — Ariel Mercado
(74) *Attorney, Agent, or Firm* — Fenwick & West LLP

(57) ABSTRACT

An educational digital publication platform coordinates distribution of multilayered content documents to multiple devices of a user. The platform ingests content and transforms it into a form suitable for web-based publication in the form of a multilayered document while preserving page fidelity. EReading browser applications executing on user devices render layers of the multilayered content into a form readable by end users. The publishing platform authenticates or denies requests to access content on each device and manages distribution of the content to the browser applications executing on authenticated devices, thereby effectively connecting multiple devices of the same user. As the end user interacts with the content, activities are logged by the platform and reported to all the user's connected devices in order to synchronize delivery of content and services.

10 Claims, 5 Drawing Sheets

(56) References Cited

U.S. PATENT DOCUMENTS

| | | |
|---|---|---|
| 2004/0003097 A1 | 1/2004 | Willis et al. |
| 2004/0167987 A1 | 8/2004 | Reese |
| 2004/0205559 A1 | 10/2004 | Sirhall |
| 2004/0268253 A1 | 12/2004 | DeMello et al. |
| 2006/0265418 A1 | 11/2006 | Dolezal et al. |
| 2007/0118794 A1 | 5/2007 | Hollander et al. |
| 2008/0082381 A1 | 4/2008 | Muller et al. |
| 2008/0082911 A1 | 4/2008 | Sorotokin et al. |
| 2008/0177782 A1 | 7/2008 | Poston et al. |
| 2009/0094648 A1 | 4/2009 | Patel et al. |
| 2009/0271872 A1 | 10/2009 | Ishizuka et al. |
| 2010/0077319 A1* | 3/2010 | Xu et al. .................. 715/753 |
| 2010/0192210 A1 | 7/2010 | Purdy et al. |
| 2010/0269030 A1 | 10/2010 | Dugonjic et al. |
| 2011/0106970 A1* | 5/2011 | Song et al. ................ 709/236 |
| 2011/0184811 A1 | 7/2011 | Patwa et al. |
| 2011/0197121 A1 | 8/2011 | Kletter |
| 2012/0013622 A1 | 1/2012 | Mahajan et al. |
| 2012/0016656 A1 | 1/2012 | Travieso et al. |
| 2012/0030553 A1 | 2/2012 | Delpha et al. |
| 2012/0042236 A1 | 2/2012 | Adler, III et al. |
| 2012/0191844 A1 | 7/2012 | Boyns et al. |
| 2012/0197893 A1 | 8/2012 | Aravamudan et al. |
| 2012/0197998 A1* | 8/2012 | Kessel ............... H04L 67/1095 709/205 |
| 2012/0240243 A1* | 9/2012 | Allardyce ........... G06F 21/6218 726/28 |
| 2013/0031451 A1* | 1/2013 | Rubinstein et al. ......... 715/208 |
| 2013/0170813 A1 | 7/2013 | Woods et al. |
| 2013/0262439 A1 | 10/2013 | Hao et al. |
| 2013/0305289 A1 | 11/2013 | Patel et al. |

FOREIGN PATENT DOCUMENTS

| | | |
|---|---|---|
| KR | 10-2011-0120574 A | 11/2011 |
| KR | 10-2012-0087307 A | 8/2012 |
| WO | WO 2012/039966 A1 | 3/2012 |

OTHER PUBLICATIONS

PCT International Search Report and Written Opinion for PCT/US2013/054543, Nov. 14, 2013, 9 Pages.

* cited by examiner

MULTILAYERED DOCUMENT DISTRIBUTION IN MULTISCREEN SYSTEMS

CROSS REFERENCE TO RELATED APPLICATIONS

This application relates to U.S. patent application Ser. No. 13/253,011, which is incorporated by reference in its entirety.

BACKGROUND

Field of the Invention

This invention relates to distribution of multilayered electronic content to a plurality of consumer devices.

Description of the Related Art

The rapid shift to mobile internet services is bringing content offerings to an increasingly larger number of connected devices. Experiences previously limited to a single device are now accessible across multiple devices as high volume consumer electronic platforms such as smart phones, tablets, eReaders, game systems, and Internet TVs have become new channels to receive digital documents and services. Popular electronic book services leverage standardized publishing formats to seamlessly integrate and synchronize digital document reading experiences across consumer devices.

But as new digital services are progressively embedded within the original document, merging these additional content layers into a single reading experience becomes increasingly more difficult. Most importantly, as digital documents shift from a static model to a dynamic model, in which related, personalized, and social content are aggregated dynamically within the original document, publishing services must be able to manage and distribute these new content layers across a plurality of connected devices.

SUMMARY

As such, embodiments of the invention coordinate distribution of multilayered content documents to multiple devices of a user. Content is ingested and transformed into a form suitable for web-based publication in the form of a multilayered document. At least a first layer of the multilayered document is distributed to a first user device for rendering in an eReading browser application. A request is received to access the multilayered document on a second device of the same user. The request is associated with an identifier of the user, an identifier of the second device, and an identifier of the multilayered document. Responsive to the request, access is authenticated to at least a second layer of the document on the second device. Accordingly, at least the second layer is distributed to an eReading browser application executing on the second device. As the end user interacts with the content, activities are logged by the platform and reported to all the user's connected devices in order to synchronize delivery of content and services.

Other embodiments include a system and a non-transitory computer-readable storage medium for distributing layers of a multilayered document according to the techniques described above.

The features and advantages described in this specification are not all-inclusive and, in particular, many additional features and advantages will be apparent to one of ordinary skill in the art in view of the drawings, specification, and claims.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Overview

The rapid growth of web-based publishing services and growing adoption of electronic books demonstrates the readiness of consumers to migrate from print to digital content. However, given the plethora of Internet-ready devices available to consumers, the way these consumers interact with online content is also rapidly changing. Rather than accessing information through a single computing device, users expect information to be available on many different types of devices. By leveraging the different attributes of the devices and enabling users to distribute information across multiple devices simultaneously, a more user-friendly, interactive reading experience is created.

Figure 1:
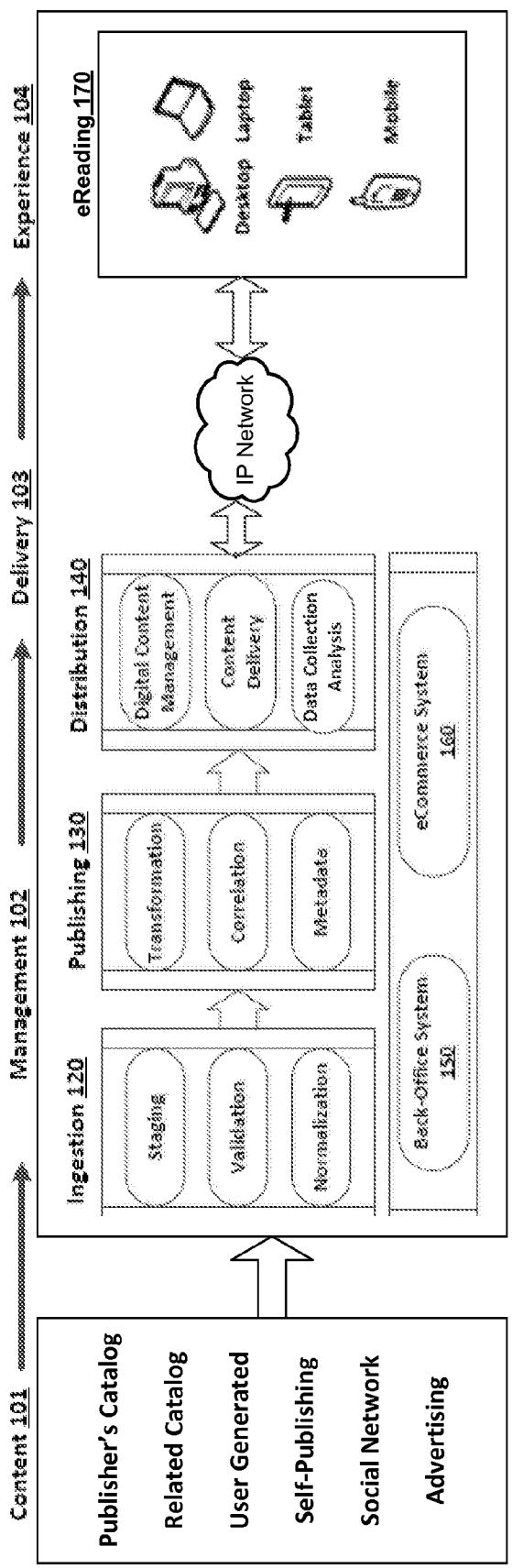
FIG. 1 is a high-level block diagram of a platform environment in accordance with an embodiment of the invention.

Embodiments of the invention provide a method for distributing multilayered documents to a plurality of user devices. The method is organized around an educational digital publication and reading platform configured to aggregate, manage, and distribute multilayered content. FIG. 1 is a high-level block diagram illustrating the platform environment, organized around four function blocks: content 101, management 102, delivery 103, and experience 104. These blocks are described in more detail in U.S. application Ser. No. 13/253,011, incorporated herein by reference in its entirety. Briefly, content block 101 aggregates content that will be delivered by the platform. Management block 102 comprises five blocks with respective submodules: ingestion 120, publishing 130, distribution 140, back office system 150, and eCommerce system 160. Ingestion 120 includes staging, validation, and normalization subsystems; publishing 130 includes transformation, correlation, and metadata subsystems; and distribution 140 includes digital content management, content delivery, and data collection analysis subsystems. Back-office system 150 enables business processes such as human resources tasks, sales and marketing, customer and client interactions, and technical support. The final subsystem of management block 102, eCommerce system 160, interfaces with back office system 150, publishing 130, and distribution 140 to integrate marketing, selling, servicing, and receiving payment for digital products and services. Delivery block 103 of an educational digital publication and reading platform distributes content for user consumption by, for example, pushing content to edge servers on a content delivery network. Experience block 104 manages user interaction with the publishing platform by updating content, reporting users' reading activities, and assessing network performance.

Multilayered Content Management System

A multilayered document comprises a core document layer and one or more additional content layers. The core layer is a standalone document comprising one or more pages of a publication, and additional content layers comprise supplemental content associated with the pages of the core layer. In one embodiment, the core layer is a book, comprising one or more pages of content with text and images. In other embodiments, the core layer may be any other published document.

Figure 2:
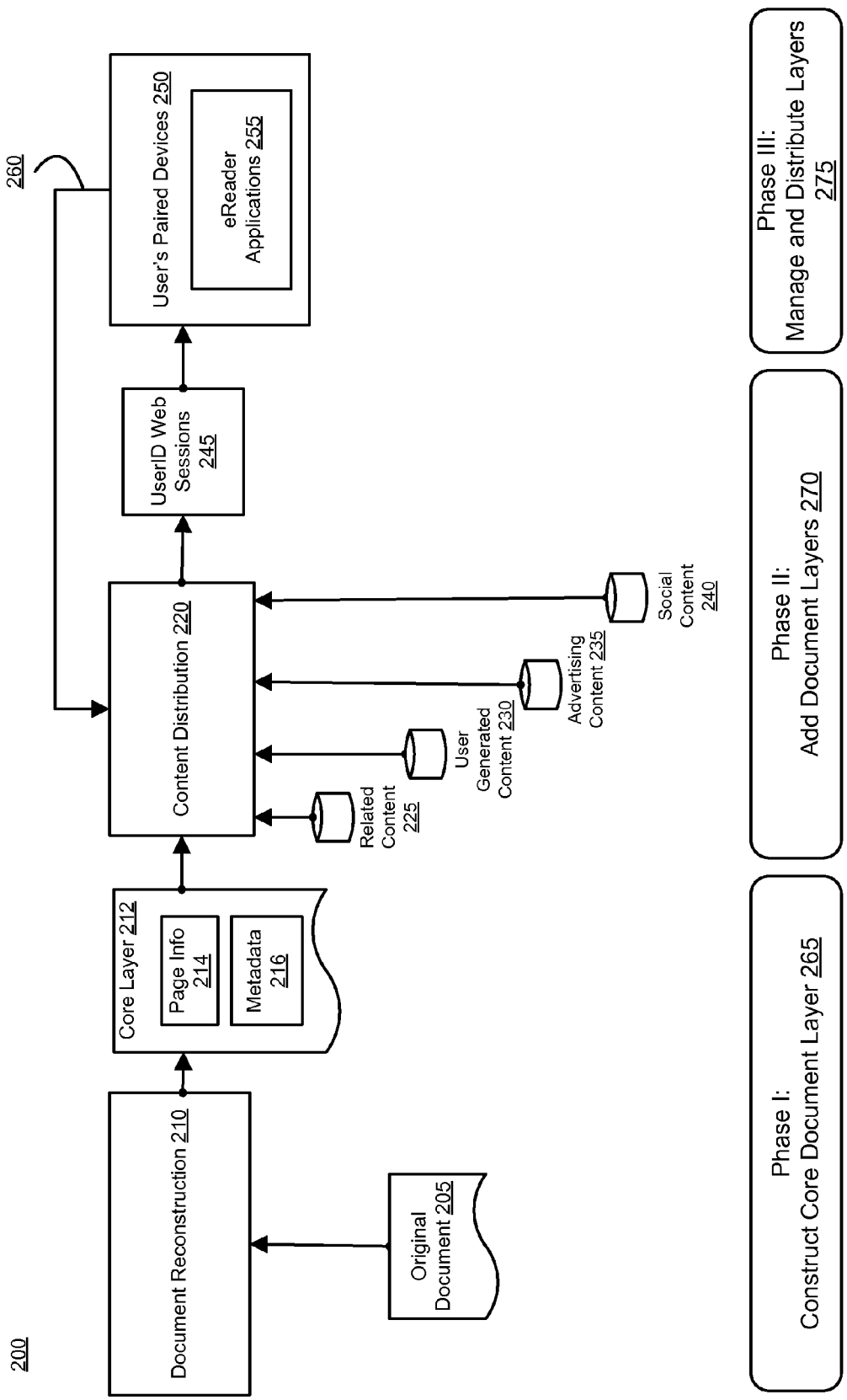
FIG. 2 illustrates a block diagram of a digital publishing platform in accordance with an embodiment of the invention.

FIG. 2 is a block diagram illustrating an example of a digital publishing platform 200 for constructing, managing, and distributing multilayered documents. Aspects of the digital publishing platform 200 may function similarly to the systems 120, 130, and 140 described with reference to the content distribution platform 102 of FIG. 1. Construction, management, and distribution is organized around three phases: Phase 1265 constructs a core document layer, Phase II 270 supplements the core document layer with additional document layers, and Phase III 275 organizes layer management and distribution.

The publishing platform 200 initially ingests original document 205, a published document that may be in one of a variety of different formats such as PDF, ePUB2, ePUB3, XML, HTML, and SVG. If original document 205 is in a markup language format, it may be ingested into content distribution system 220. However, if original document 205 is not in a markup language format, in Phase 1265, original document 205, e.g., a textbook, is ingested by the publishing platform into document reconstruction system 210. Reconstruction system 210 automatically identifies, extracts, and indexes all the key elements and composition of original document 205 in order to reconstruct it into a modern, flexible, and interactive HTML 5 format. The ingested documents are converted by the reconstruction process into markup language documents well-suited for distribution across various computing devices. Reconstruction system 210 reconstructs the original documents so as to accommodate dynamic add-ons, such as user-generated and related content, while maintaining page fidelity to the original document. The transformed content preserves the original page structure including pagination, number of columns and arrangement of paragraphs, placement and appearance of graphics, titles and captions, and fonts used, regardless of the original format of the source content and complexity of the layout of the original document 205.

The output of reconstruction system 210 is core document layer 212 comprising a set of basic elements of document 205: page info 214 and metadata 216. In another embodiment, core layer 212 may not be the output of reconstruction system 210, but rather the original document 205 ingested by the publishing platform 200. Page info 214 includes the pagination, number of columns and arrangement of paragraphs, placement and appearance of graphics, titles and captions, and fonts used in original document 205 such that document 205 may be reconstructed while preserving the original page structure. In various examples, metadata 216 includes product description, pricing, terms (e.g., whether the content is for sale, rent, or subscription, or whether it is accessible for a certain time period or geographic region, etc.), and a list of supplemental layers that may be purchased or downloaded in conjunction with core layer 212.

Page info 214 and metadata 216 are then passed, in Phase II 270, to content distribution system 220. Additional content layers are added to the document in Phase II 270, such as related content 225, user-generated content 230, advertising content 235, and social content 240, or any other categories of content. Related content 225 comprises material produced by the publisher of original document 205 to supplement the core document, such as study guides, self-testing material, solutions manuals, or glossaries. Related content 225 may also comprise material licensed to publishers other than the publisher of original document 205 that supplements the core document 212, such as peer-reviewed journal articles. User-generated content 230 comprises annotations made by a user during an eReading session, such as highlighting or taking notes. Advertising content 235 may be uploaded by advertisers or advertising agencies to the publishing platform, such that advertising content may be displayed within a layer of the document. Social content 240 may be uploaded to the publishing platform by the user or by other nodes (e.g., classmates, teachers, authors, etc.) in the user's social graph. Examples of social content 240 include interactions between users related to the document, content shared by members of the user's social graph, and many others. Page info 214 is referenced by all layers added to the document during Phase II 270 to merge all content layers into a single reading experience.

After constructing a multilayered document, content distribution system 220 distributes content dynamically and on-demand through web sessions 245 authenticated for a particular User ID. Web sessions 245 are created each time a user requests to access a multilayered document, and are unique for each combination of user requesting access, device from which the request is activated, and document being requested. By delivering content through authenticated web sessions 245, content distribution system 220 can protect document 205 by limiting access to a particular user and set of devices, while organizing and synchronizing the distribution of multiple layers of a multilayered document to a plurality of a user's devices.

In Phase III 275, the platform 200 organizes layer management and distribution 275. Content distribution system 220 passes all content layers by web sessions 245 to eReading browser applications 255, comprising client software compatible with web browsers executing on paired devices 250. At least one browser application is executing on each device, which may be a desktop computer, a laptop computer, a tablet, a Smart Phone, an Internet TV, or any other device capable of accessing the Internet. Browser applications 255 facilitate user interaction with content, such as reading the content, navigating between pages, annotating the content, interacting with advertisements, and creating social content. Contrary to other existing digital publishing services, the educational digital publication and reading platform of the present invention allows the user to access content without downloading a specific reading application from the publisher. Rather, browser applications 255 construct document pages using structureless HTML5 elements such as page info 214 and metadata 216. It should be noted that browser applications 255 comprise eReading applications as well as supplemental content applications that function in the browser environment to support the user's eReading activities and overall engagement with the multi-layered documents distributed by the platform, such as user-generated applications, social applications, and advertising applications.

Browser applications 255 integrate user reading activities and log data to synchronize the activities across all paired devices 250. Logged data is reported back to content distribution module 220 as shown by reference 260, and thereby used to update and/or create additional content layers in Phase II 270. An end user may also request additional layers during an eReading web session, for example by purchasing a related content layer 225 while reading the core document layer 212. Accordingly, Phases II 270 and III 275 may be repeated as necessary during a web session 245 to dynamically update and aggregate all document content into a seamless user experience.

Requesting Layered Documents

Figure 3:
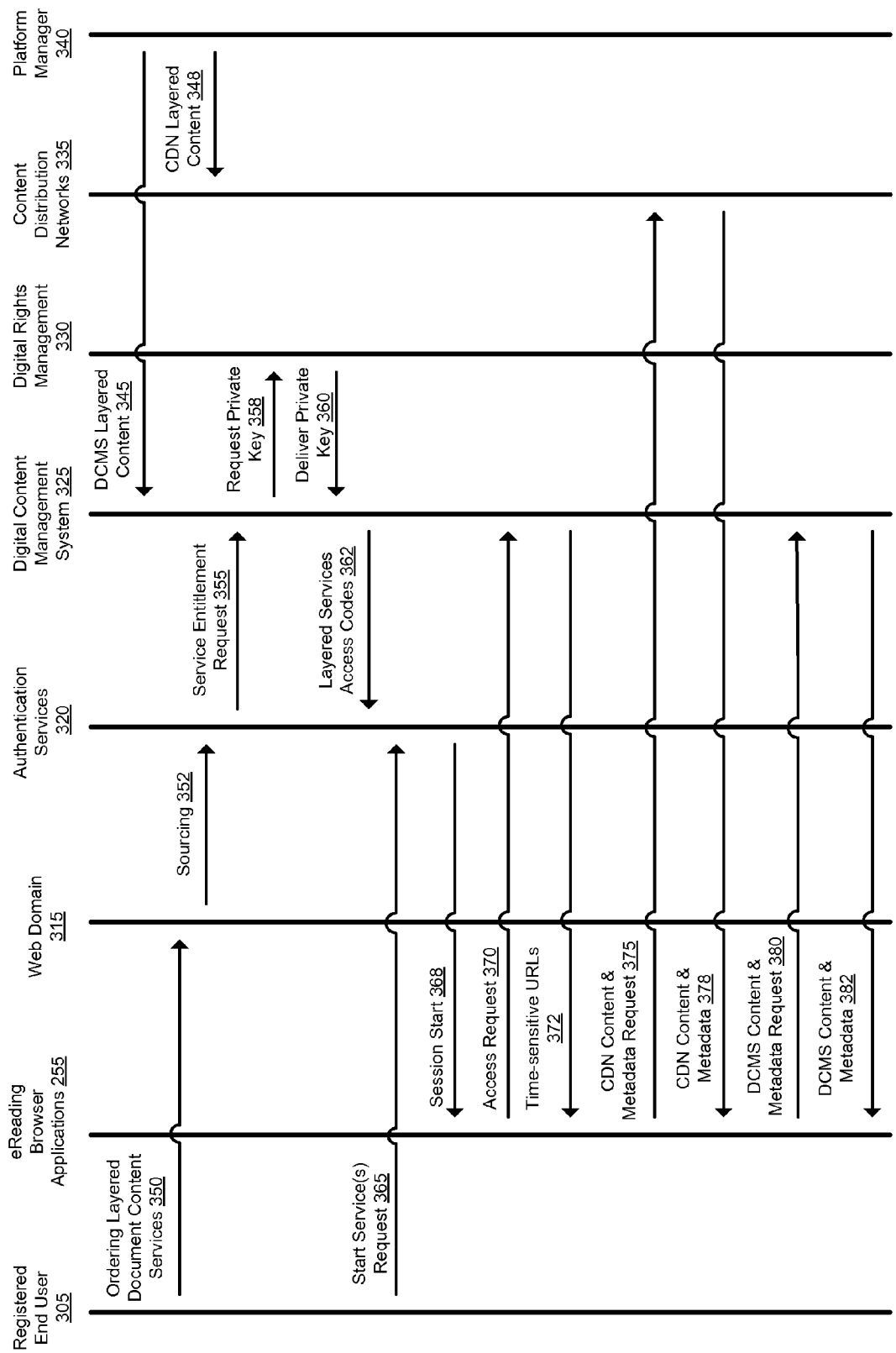
FIG. 3 is an interaction diagram with event traces illustrating initial content access in a multilayered content distribution system, in accordance with an embodiment of the invention.

FIG. 3 illustrates one embodiment of the content distribution process when a user makes an initial request to access a particular multilayered document. The content distribution process involves a registered end user 305, eReading browser applications 255, web domain 315, authentication services 320, digital content management system (DCMS) 325, digital rights management (DRM) 330, content distribution networks (CDN) 335, and publishing manager 340. In the diagram, time flows from top to bottom of the figure and horizontal arrows between entities represent communications.

Publishing manager 340 is a system that operates the multilayered content distribution system. For example, manager 340 may comprise content block 101 and management block 102 of FIG. 1. Manager 340 also hosts document reconstruction 210, and as such is responsible for gathering content and converting it into a structureless markup language format for distribution to end users. Prior to an initial user request to access multilayered content, content layers are pushed in steps 345 and 348, respectively, from publishing manager 340 to digital content management system (DCMS) 325 or content distribution networks (CDN) 335, which will be described in further detail below.

The content available for purchase, including catalogs, indexes, and related contents are made available to end user 305, the primary consumer of content, to order from within the eReading application 255. In step 350, user 305 orders desired layered document content services. The initial user request is received by web domain 315, which comprises a service provider domain name and web site to which browser 255 points to access a document.

Domain 315 transfers the content request to authentication services 320 with data identifiers describing the user 305, the requested document, and the user's device. In one embodiment, authentication services 320 are a subsystem of publishing platform 200 that authenticates and logically connects devices 250 to the management and distribution processes of the platform.

The data identifiers transferred by domain 315 are used to determine the user requesting access, the content that is being requested, and the device for which access is requested. These data identifiers are used to authenticate access to requested content based on properties of the user and the requested document. If authentication services 320 determine that the combination of user, document, and device identifiers is valid, in step 355 authentication services 320 transfers the request to DCMS 325.

DCMS 325 manages distribution of layered content to paired devices by tracking the status of access requests, ensuring content security, and reporting issues that may affect the user's reading experience or the digital content management. In one embodiment, because DCMS 325 is quickly accessible from browser applications 255, DCMS 325 also hosts relatively dynamic document layers, such as user-generated content 230, advertising content 235, and social content 240.

After receiving an authenticated request from authentication services 320, DCMS 325 requests 358 a private key from digital rights management system (DRM) 330. DRM 330, which in one embodiment is a subsystem of publishing platform 200, is responsible for encrypting content with a DRM layer. DRM 330 may use Advanced Encryption Standard (AES) Kerberos 128, or another suitable encryption method. Furthermore, DRM 330 may encrypt all layers, selective layers, a partial layer, or no layers of the document, responsive to the content's licensing terms.

DRM 330 receives the key request from DCMS 325 and subsequently delivers 360 the private key. Using the key, DCMS 325 creates a unique access code to unlock access corresponding to particular data identifiers, and delivers 362 the access codes to authentication services 320 to store until an eReading session begins. The private keys and their location may be obfuscated into the access codes to enable decryption of the document.

After access codes have been delivered to authentication services 320, user 305 requests 365 to start service. The request is passed to authentication services 320, which sends the access codes to browser 255 to start 368 the eReading session. Browser 255 next requests 370 to access multilayered content from DCMS 325, which subsequently delivers 372 time-sensitive URLs to browser 255 specifying a content location that is valid only for a short period of time.

During an eReading session, content is continually requested and rendered by browser 255 as summarized in steps 375-382. CDN 335, configured in one embodiment as a subsystem of publishing platform 200 comprising edge servers distributed around a country or the world, receives 375 and grants 378 requests from browser 255 to access content and metadata. In one embodiment, CDN 335 hosts relatively static content such as core document layers and related content layers. In this case, browser 255 also requests 380 and receives 382 the more dynamic DCMS 325 content, such as user-generated content 230, advertising content 235, and social content 240. Distributing content to both CDN 335 and DCMS 325 may, for example, decrease the time required to access content.

When a user is accessing multilayered content from a single device, steps 375-382 may be repeated as often as necessary or desired to create a seamless user reading experience. To enable a user to access multilayered content from additional devices, a similar process may be employed as described in the context of FIG. 4.

Synchronizing Multilayered Content

When a user desires to access multilayered content on more than one of the user's devices, simultaneous or near simultaneous delivery of content to all the user's connected devices effectively synchronizes the reading experience across the devices for the user. One embodiment of the process for synchronizing multiple user devices is detailed in FIG. 4. At some time after requesting 365 and receiving 368 access to multilayered content on a first device, user 305 may request 410 to access the same multilayered document on an additional device. As in the case of the first device, the request is passed to authentication services 320.

Based on the combination of user, document, and device identifiers, authentication services 320 authenticates 420 the second session start either by authenticating access to all requested layers on a particular device or by authenticating access to a subset of the requested layers. Access may be granted or denied responsive to a user's current eReading web sessions 245 and properties of the document. In one embodiment, a relevant document property that may be used to grant or deny a web session is the licensing terms of the document's publisher. For example, licensing terms may limit a layer's accessibility to one web session at a time, such that if a user were to request to access the layer on a second device while the layer is open on a first device, authentication services 320 would deny the request or the eReading browser application 255 would close the layer on the first device. Accordingly, a "start service" request may comprise a request to access multiple document layers simultaneously on one device, while the service authorization may comprise granting access to a number of document layers that is less than or equal to the number of layers requested.

When the second session is authenticated, the access codes delivered to authentication systems 320 by DCMS 325 in step 362 are transferred to browser 255 to start the second session. During an eReading session with multiple devices accessing the same document, content is dynamically updated on all connected devices. As when a single device is used to access a document, content is requested and received 430 from DCMS 325, and requested and received 440 from CDN 335. Because a common server is informed of all user activities, all changes to the document are stored in a centralized location (DCMS 325 or CDN 335) accessible by all paired devices. As connected devices communicate with that centralized location, any change made by a user interacting with one device will be distributed to the other connected devices. As a result, browser applications 255 effectively deliver 450 synchronized services to end user 305.

In addition to synchronously delivering layered content to end users, browser applications 255 report events to DCMS 325 or platform manger 340. Reported events comprise user interactions with the content during an eReading session facilitated by browser 255. Interaction might include navigating between pages, highlighting text, taking notes, printing pages, disconnecting from the platform and reconnecting, creating social content, interacting with social content, clicking on a link within an advertisement, etc. These activities may be reported 470 to DCMS 325 to track and manage content delivery, or reported 480 to the publishing manager 340 for self-publication, for example. Reporting 480 may additionally or alternatively comprise reporting device interactions with the document content through browser 255 based on their performance, display, mobility, connectivity, interactivity, and available storage.

Through reporting activities to the DCMS 325 and publishing manager 340, user and device interactions with content may be synchronized between connected devices. For example, the user may use a primary device to advance to the next page while reading a document distributed to multiple paired secondary devices. The activity "Next Page" is reported by browser 255 to DCMS 325, which logs the activity and distributes the next page of the document to the primary device as well as the secondary devices. From the user perspective, the command to access the next page is applied to all paired devices such that all devices advance simultaneously to the next page. In addition to synchronizing the activity across all devices, an activity such as advancing the page may be synchronized across all layers. Although the command is issued in the context of one layer (e.g., the next page of the core document is requested), all layers advance in response to the command (e.g., user-generated content advances from content related to the current page to content related to the next page).

As another example, the user may create one or more layers, such as a highlighting layer, during an eReading web session. The user activity corresponding to highlighting text is reported to DCMS 325, logged, and distributed to all connected devices, highlighting the same text on all devices simultaneously. Because highlighting is an activity that can be performed only within the context of one layer, only the highlighting layer would change on the connected devices in response to the user activity, while other layers remain static.

As these examples illustrate, document-related activities are effectively logged at different frequencies across layers and devices. A user may highlight text more frequently than he requests a next page, for example. The platform 200 manages activity logging and content distribution in order to deliver content synchronously to all devices, despite asynchronous reporting.

Figure 4:
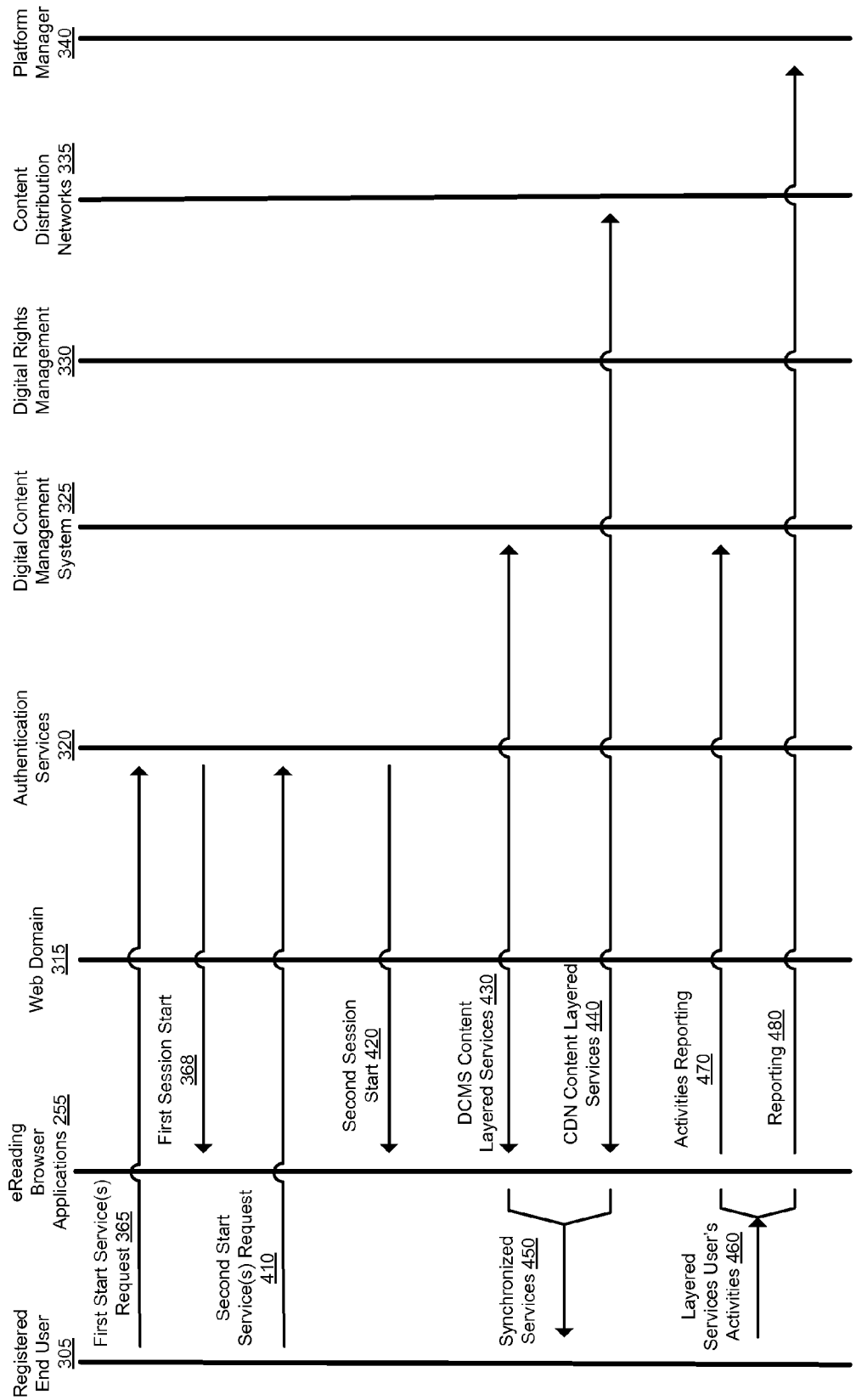
FIG. 4 is an interaction diagram with event traces illustrating secondary content access in a multilayered content distribution system, in accordance with an embodiment of the invention.

The steps shown in FIGS. 3 and 4 are intentionally high level and not intended to represent individual computer programming instructions or operations, but rather the system inputs, behaviors, and output of the system components described above, as well as high level inter-process or inter-module communication. Those of skill in the art will appreciate that the steps shown can be implemented in practice as multiple operations.

Figure 5:
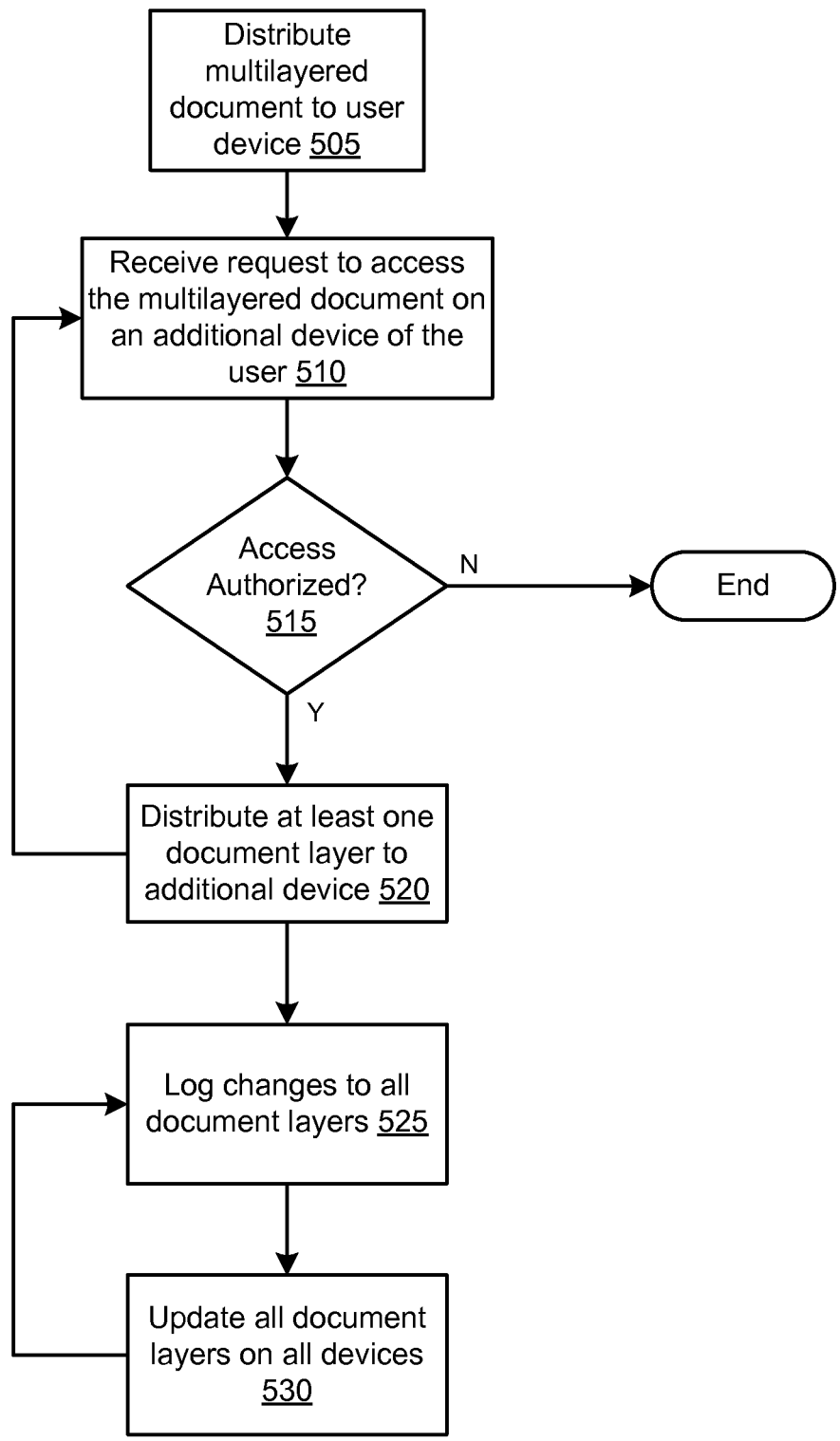
FIG. 5 is a flowchart illustrating the method of multilayered content distribution, in accordance with an embodiment of the invention.

The multiscreen document distribution process is outlined in the flowchart of FIG. 5. A multilayered document is distributed 505 to a first user device. For example, a user may submit a request to read "Biology 101," a textbook (core document layer 212) with a study guide (related content layer 225), from his laptop. After the request is authenticated and the service has been initiated in a web session 245 within an eReading browser application 255 executing on the user's laptop, as described in the context of FIG. 3, the user may view and interact with the textbook and study guide. As the user reads the textbook, he may highlight important concepts or take notes within the browser environment that are associated with particular locations within the textbook, thereby creating user-generated content layers 230. The user-generated content layers 230 are indexed to the core document layer 212 to associate each component of the layers with a region of a page or a section of the document, such as a highlight or note associated with a line of text. Advertisements from the publisher of the Biology 101 textbook or outside sources may be displayed within the browser environment, generating an advertising content layer 235. The user may also create or access a social content layer 240 by interacting with other nodes in his social graph, such as classmates, through the eReading browser application. Such social activity may comprise the user reading a note posted to the social network by a classmate, or the reading activity of the user being reported to the social network. Additionally or alternatively, the user may request to download an additional related content layer 225 during a web session, such as purchasing a solutions manual corresponding to the Biology 101 textbook.

Next, a request is received 510 to access the multilayered document on a second device of the same user. Continuing the example above, the user may request to access the Biology 101 textbook and associated layers on his tablet at the same time as the layers are available on his laptop. The access request is sent to the authentication services 320, and as described in the context of FIG. 4, authentication services 320 may grant access to all requested layers or some requested layers, or deny the request in its entirety. For example, the licensing terms of the Biology 101 textbook may specify that a given user can only access the textbook through one eReading application at a time. If the user requests to access the textbook on a tablet while accessing the textbook on a laptop, the request from the tablet may be denied. However, access to the other layers may be granted on the tablet, enabling the user to view, for example, his notes on the tablet while reading the textbook on his laptop.

If access to at least one document layer is authenticated 515, at least one of the authenticated layers is distributed 520 to the second device. The user may choose, for example, to read the textbook on his laptop and while viewing notes that are tied to the textbook on his tablet. He may view the notes on his laptop in addition to his tablet, or he may view the notes only on his tablet. If access to the textbook is authenticated on both devices, the user may view the textbook with highlights on the laptop while viewing the textbook with notes on the tablet. Other content layers may be distributed to one or both devices, and the user may choose any combination of layers to be present in the eReading browser applications executing on the two devices. The user may move content layers at any time while reading and interacting with the multilayered document such as, for example, closing the textbook layer on the laptop and opening it on the tablet.

The user may also request to access the multilayered document on additional devices. Steps 510-520 of FIG. 5 may be repeated multiple times until all devices the user wishes to use to view one multilayered document are connected. Any number and combination of layers may be viewed on any of the devices within any constraints imposed by authentication services 320. As a result, a multilayered document becomes a dynamic, flexible educational tool that leverages a plurality of user devices to deliver an interactive, user-friendly reading experience.

After access has been authenticated on one or more devices, all changes to any document layer are logged 525, in order that all changes may be updated 530 on all devices. For example, if the user is accessing a textbook with user-generated highlights from a laptop, notes and social content from a tablet, social content from a mobile phone, and advertising content on all three devices, any change made from any of the three devices will be updated on all the devices. The user may, for example, turn to the next page of the textbook on the laptop. At the same time as the browser application 255 executing on the laptop receives the next page from the CDN 335, renders the new page, and displays highlights corresponding to the new page, the notes layer on the tablet may be advanced to the notes corresponding to the new page. Advertisements may synchronously update on all three devices, while social content, which may not correspond to a particular page, remains static.

Additional Configuration Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for coordinating distribution of a multilayered document to eReading applications executing on a plurality of a user's devices, the method comprising:
   accessing the multilayered document at an eReading platform, the multilayered document comprising a core layer and one or more additional layers, wherein the core layer comprises one or more pages of a publication, and wherein the one or more additional layers comprise supplemental content associated with the pages, the core layer and the one or more additional layers stored at a plurality of locations associated with the eReading platform;
   generating at the eReading platform, an access code for unlocking access to the multilayered document;
   sending, by the eReading platform the generated access code to a plurality of devices of a user for storage by the plurality of devices;
   receiving, by the eReading platform the access code from a first device of the plurality of devices and from a second device of the plurality of devices of the user;
   responsive to receiving the access code from the first device and the second device,
      sending, to the first device and the second device from the eReading platform, a set of time-sensitive uniform resource locators (URLs) referencing the plurality of locations, the time-based URLs referencing the plurality of locations prior to a time of expiry and not referencing the plurality of locations after the time of expiry;
   responsive to the first device accessing one or more of the plurality of locations using the time-sensitive URLs, distributing to the first device at least a first layer of the multilayered document for rendering during a first authenticated session of a first eReading browser application executing on the first device, wherein the at least first layer of the multilayered document distributed to the first device comprises a first set of layers;

responsive to the second device accessing one or more of the plurality of locations using the time-sensitive URLs, distributing to the second device at least a second layer of the multilayered document for rendering during a second authenticated session of a second eReading browser application executing on the second device, wherein the at least second layer of the multilayered document comprises a second set of layers, wherein the first set of layers is not identical to the second set of layers, and wherein the first session overlaps in time with the second session;

receiving at the eReading platform, a change made to the second layer at the second device;

storing the received change at one of the plurality of locations; and dynamically sending the received change of the second layer to the first device to provide a synchronized service to the user.

2. The method of claim 1, wherein accessing the multilayered document further comprises:

receiving a request to access on the second user device the multilayered document, wherein the request is associated with an identifier of the user, an identifier of the second device, and an identifier of the multilayered document;

authorizing the access by the second to the second set of layers based on the identifier of the user, the identifier of the second device, and the identifier of the multilayered document; and responsive to authorizing the access, sending the access code to the second device.

3. The method of claim 1, further comprising distributing the second layer to the first device.

4. The method of claim 1, wherein the multilayered document is in a markup language format.

5. The method of claim 1, wherein an identifier of the device comprises an IP address.

6. A computer program product for coordinating distribution of a multilayered document to eReading applications executing on a plurality of a user's devices, the computer program product comprising a non-transitory computer-readable storage medium having instructions encoded thereon, when executed by a processor, cause the processor to:

access the multilayered document at an eReading platform, the multilayered document comprising a core layer and one or more additional layers, wherein the core layer comprises one or more pages of a publication, and wherein the one or more additional layers comprise supplemental content associated with the pages, the core layer and the one or more additional layers stored at a plurality of locations associated with the eReading platform;

generate at the eReading platform, an access code for unlocking access to the multilayered document;

send, by the eReading platform, the generated access code to a plurality of devices of a user for storage by the plurality of devices;

receive, by the eReading platform, the access code from a first device of the plurality of devices and from a second device of the plurality of devices of the user;

responsive to receiving the access code from the first device and the second device, send, to the first device and the second device from the eReading platform, a set of time-sensitive uniform resource locators (URLs) referencing the plurality of locations, the time-based URLs referencing the plurality of locations prior to a time of expiry and not referencing the plurality of locations after the time of expiry;

responsive to the first device accessing one or more of the plurality of locations using the time-sensitive URLs, distribute to the first device at least a first layer of the multilayered document for rendering during a first authenticated session of a first eReading browser application executing on the first device, wherein the at least first layer of the multilayered document distributed to the first device comprises a first set of layers;

responsive to the second device accessing one or more of the plurality of locations using the time-sensitive URLs, distribute to the second device at least a second layer of the multilayered document for rendering during a second authenticated session of a second eReading browser application executing on the second device, wherein the at least second layer of the multilayered document comprises a second set of layers, wherein the first set of layers is not identical to the second set of layers, and wherein the first session overlaps in time with the second session;

receive at the eReading platform, a change made to the second layer at the second device;

store the received change at one of the plurality of locations; and dynamically send the received change of the second layer to the first device to provide a synchronized service to the user.

7. The computer program product of claim 6, wherein accessing the multilayered document further comprises:

receive a request to access on the second user device the multilayered document, wherein the request is associated with an identifier of the user, an identifier of the second device, and an identifier of the multilayered document;

authorize the access by the second to the second set of layers based on the identifier of the user, the identifier of the second device, and the identifier of the multilayered document; and responsive to authorizing the access, sending the access code to the second device.

8. The computer program product of claim 6, further comprising instructions that when executed by the processor cause the processor to distribute the second layer to the first device.

9. The computer program product of claim 6, wherein the multilayered document is in a markup language format.

10. The computer program product of claim 6, wherein an identifier of the device comprises an IP address.

* * * * *